United States Patent [19]

Colwell

[11] Patent Number: 5,431,424

[45] Date of Patent: Jul. 11, 1995

[54] FIFTH WHEEL SLIP PLATE

[76] Inventor: J. Bruce Colwell, R.R. 5, Lucknow, Ontario, Canada

[21] Appl. No.: 224,315

[22] Filed: Apr. 7, 1994

[51] Int. Cl.⁶ .................... B62D 53/08; F16C 17/04
[52] U.S. Cl. .................................... 280/433; 384/421
[58] Field of Search ............... 280/433, 438.1, 441.1; 384/421

[56] References Cited

U.S. PATENT DOCUMENTS

| | | | |
|---|---|---|---|
| 3,924,909 | 12/1975 | Kent et al. | 280/433 X |
| 4,169,635 | 10/1979 | Szalay et al. | 280/433 X |
| 4,542,912 | 9/1985 | St. Louis | 280/433 |
| 4,752,081 | 6/1988 | Reeners et al. | 280/433 |
| 5,165,713 | 11/1992 | Picard | 280/433 |
| 5,165,714 | 11/1992 | Kaim | 280/433 |
| 5,263,856 | 11/1993 | Huehn et al. | 280/433 X |

FOREIGN PATENT DOCUMENTS 2200334  8/1988  United Kingdom ................. 280/433

Primary Examiner—Margaret A. Focarino
Assistant Examiner—Kevin Hurley
Attorney, Agent, or Firm—R. Craig Armstrong

[57] ABSTRACT

A fifth wheel slip plate is described, in which plastic inserts are used in the plastic slip plate instead of metal skip plates, and in which a composite plastic material is used for outer lateral portions of the slip plate. The plastic of the insert, preferably nylon, is substantially harder than the plastic of the slip plate, which is preferably ultra high molecular weight polyethylene. The harder plastic insert therefore does not compress as much as the slip plate, and therefore absorbs the primary impact during the coupling operation. The composite material outer portions absorb much of the impact damage, without the undesirable friction which metal would produce, and they are relatively simple to replace, without need to replace the whole slip plate.

18 Claims, 3 Drawing Sheets

FIFTH WHEEL SLIP PLATE

BACKGROUND OF THE INVENTION

This invention relates to improvements in tractor-trailer fifth wheel couplings and, more particularly, to a low-friction, plastic slip plate or slip plate assembly which is placed between the fifth wheel top plate and the trailer bolster plate.

Such slip plates are known in the prior art, and are used to obviate the need for repeatedly lubricating the fifth wheel tractor-trailer coupling. See, for example, the disclosures of U.S. Pat. Nos. 4,169,635; 3,704,924 and 4,752,081. The slip plates are commonly held in place on the fifth wheel top plate by screws, rivets, adhesives, or preferably by welding with "weld fasteners".

The slip plates are commonly made from ultra high molecular weight polyethylene (UHMW PE) or ultra high molecular weight polystyrene (UHMW PS). These materials are preferred due to their exceptionally low coefficient of friction.

However, it has been found that slip plates from these materials are prone to damage if not protected somehow; the plastic is excellent for lubrication, but tends to damage relatively easily.

During the coupling between tractor and trailer, the mating bearing surfaces often impact each other suddenly and with considerable force. Such impact can cause tearing or shearing of the slip plate. To protect the slip plate during this coupling operation, metal "riser bars" or "skip plates" have been used in the prior art, each being positioned within a similarly shaped slot located in the interior region of the slip plate. For example, see U.S. Pat. Nos. 4,542,919 and 4,752,081. Such skip plates may be substantially flush with the surface of the slip plate, but preferably, as disclosed in U.S. Pat. No. 4,752,081, the thickness of such skip plates is slightly less than the thickness of the slip plate, i.e. the skip plates are recessed slightly below the upper surface of the slip plate. The skip plates absorb the impact of the trailer bolster plate, so that the slip plate is not damaged.

Although these skip plates, particularly as described in U.S. Pat. No. 4,752,081, offer improvements over what was previously available, nevertheless there remains room for improvement. One problem in particular is that the metal skip plates are more difficult to install and replace than is desirable, as well as being more expensive than is desirable. Another problem is that as the plastic slip plate wears down, the metal skip plates may become exposed, producing a metal-on-metal situation which may cause undesirable friction, and which thus reduces the benefit of having a plastic slip plate in the first place.

The outer areas of the plate also need additional impact and wear resistance. In the past, this has been dealt with by metal edges on the slip plate, as in U.S. Pat. No. 4,542,912, for example.

SUMMARY OF THE INVENTION

In view of the foregoing, it is an object of this invention to provide an improved fifth wheel slip plate, which provides impact and wear protection in a manner similar to that provided by metal skip plates, but which provides improvements in materials and configuration.

Thus in the invention, plastic inserts are used in the interior areas of the plate instead of metal skip plates, one on each side of the central opening, and are configured for optimum performance. The plastic of the insert, preferably nylon, is substantially harder than the plastic of the slip plate, and therefore does not compress as much as the slip plate, and therefore absorbs the primary impact during the coupling operation. It is simple to cut the plastic insert to the optimum shape, and it is relatively inexpensive to replace it when worn or damaged.

Preferably, the inserts are thinner than the slip plate itself, and the slip plate is recessed at the insert locations by about the thickness of the inserts, i.e. the slip plate is continuous under the inserts, rather than being slotted. Preferably, the recess dimensions match the insert dimensions such that the inserts can be pressed into the recesses and will not fall out during shipping or handling prior to installation.

The outer lateral portions of the slip plate are of a relatively hard, impact resistant composite material, such as a cotton/phenolic laminate.

A one-piece slip plate can be employed if desired, but preferably a two-section slip plate assembly is employed, in which two sections together define a U-shape. A gap may be left at the base of the U-shape. Wherever "slip plate" is used herein, it should be clearly understood that this could mean either the one-piece version, or the two-piece assembly, unless the context clearly indicates one or the other only.

BRIEF DESCRIPTION OF THE DRAWINGS

The invention will be better understood from the ensuing detailed description of the preferred embodiment, by way of example only. Reference will be made to the accompanying drawings, in which.

DETAILED DESCRIPTION

Figure 1:
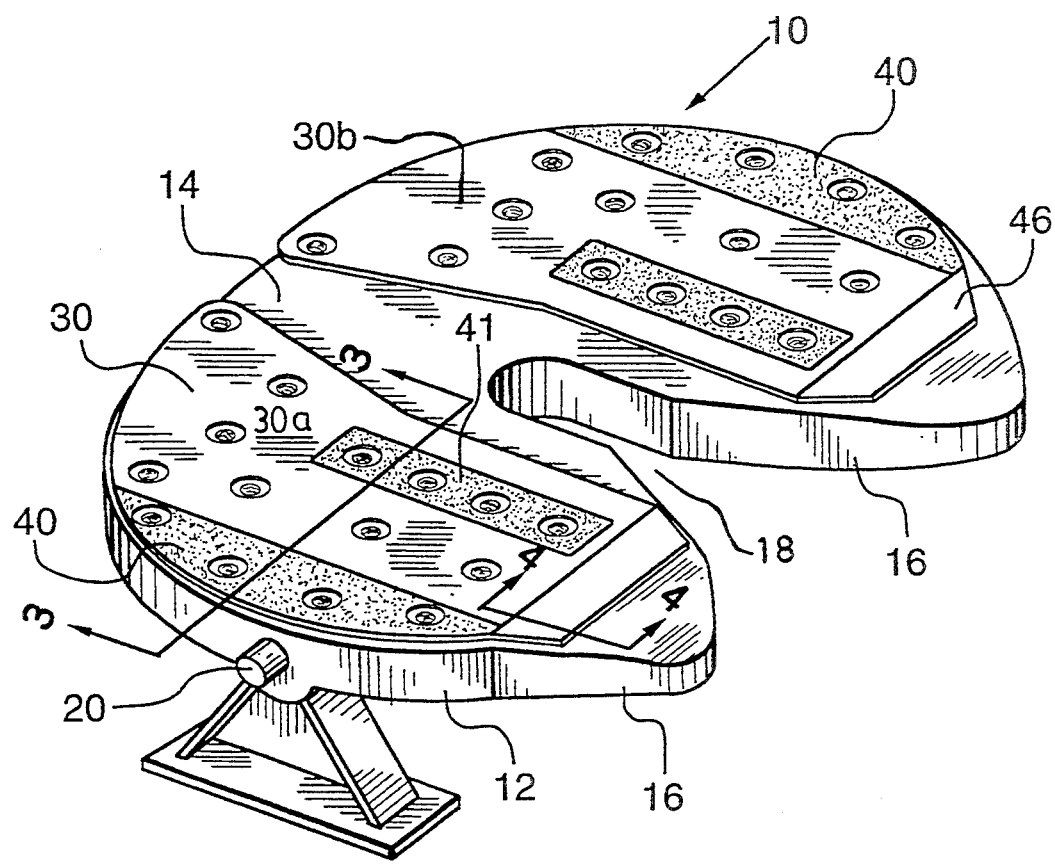
FIG. 1 is a perspective view showing a slip plate assembly on a fifth wheel assembly, the slip plate assembly having two mirror-image sections together defining a U-shape.
Figure 2:
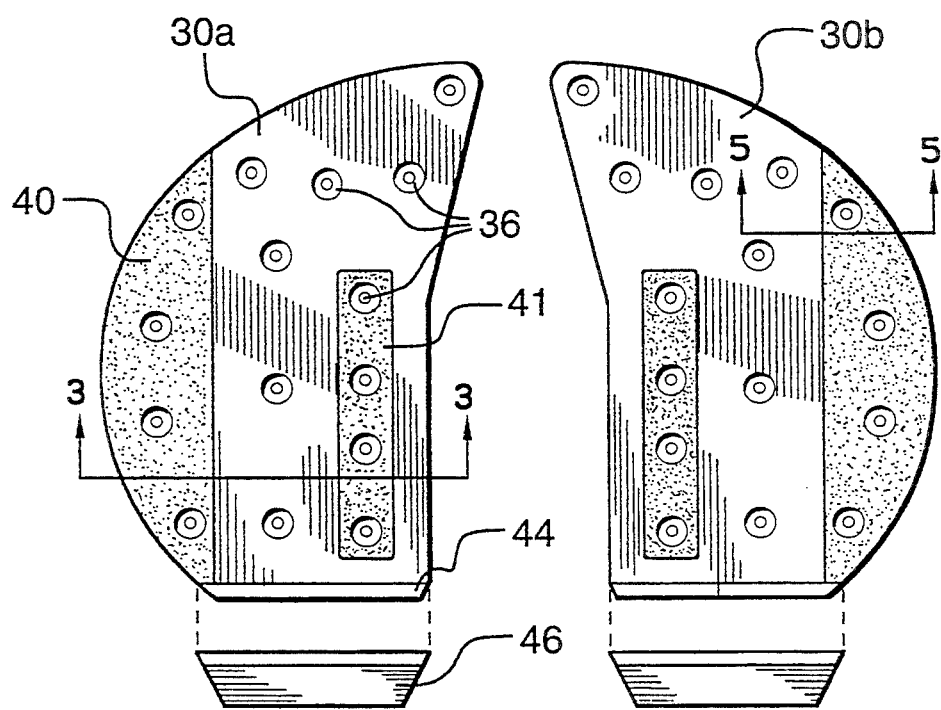
FIG. 2 is a plan view of the slip plate assembly.

Referring now to the drawings, FIG. 1 illustrates a tractor fifth wheel assembly 10 embodying the present invention. As shown, a conventional fifth wheel assembly comprises a top plate 12 having a generally circular portion 14 and a pair of diverging flanges 16. The latter slope downwardly from the circular portion 14 and define therebetween a tapered, V-shaped slot 18 which serves, during coupling between tractor and trailer, to guide a trailer's kingpin to a draft connection (not shown) located at the slot apex. The top plate 12 is pivotally mounted on the tractor body by a pair of journal pins 20 so that, prior to tractor/trailer coupling, the circular portion 14 may be inclined toward the trailer to facilitate coupling and, during and after coupling, may tip forward and assume a horizontal position in which it is substantially flush with the trailer's horizontally disposed bolster plate (not shown).

Figure 6:
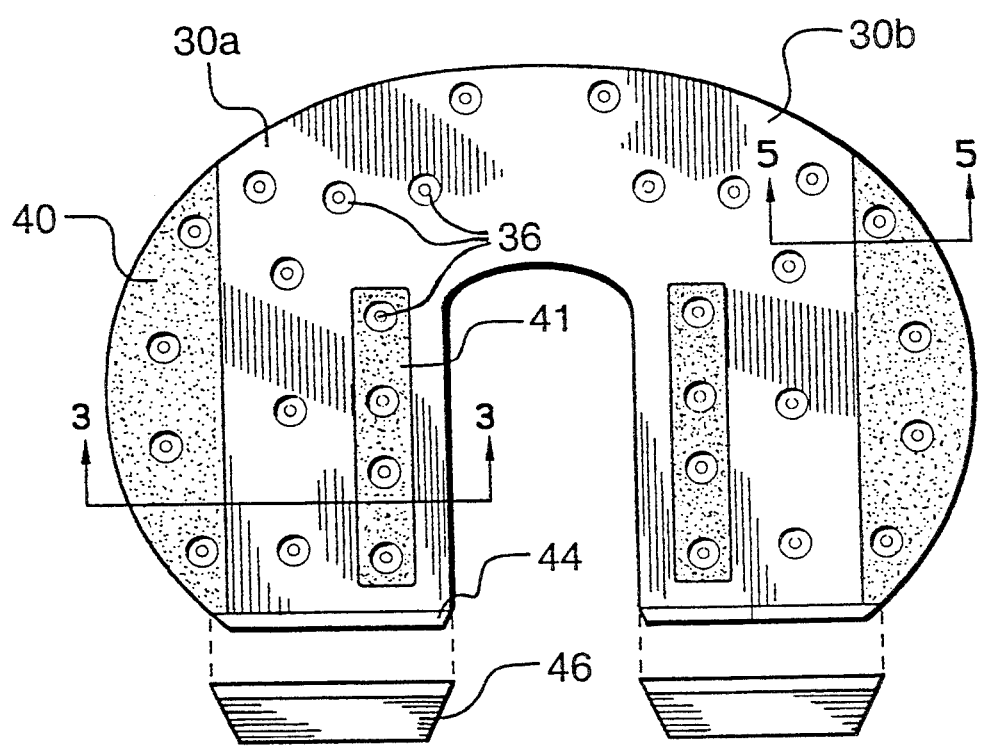
FIG. 6 is a top view of an embodiment in which the slip plate is comprised of a single piece.

To reduce wear on the mating bearing surfaces of the tractor/trailer fifth wheel assembly, the fifth wheel top plate is provided with a slip plate 30, the main portion of which is of a low-friction plastic material (e.g. an ultra high molecular weight polymer such as polyethylene or polystyrene, preferably UHMW PE). The slip plate overlies the raised outer top plate of the circular slip plate portion 14. While the slip plate may be of a single-piece U-shaped construction, as shown in FIG. 6, it is preferred that it comprises two separate sections 30a, 30b so that, if necessary, one section may be replaced without disturbing the other.

Figure 3:
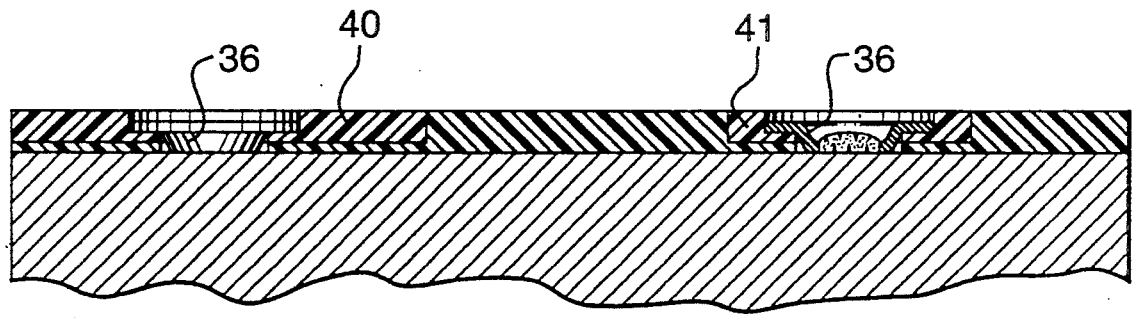
FIG. 3 is a cross-section at 3—3 of FIGS. 1 and 2.

The slip plate 30 is rigidly coupled to the underlying metal bearing surface, i.e. the top plate 12, by a plurality of "weld-washers" 36. Preferably, the weld-washers are as illustrated in FIG. 3, being essentially washers with a depressed central hole through which they are welded to the top plate by puddling the weld metal. Each weld-washer is disposed in a recess in the slip plate, the diameter of the recess preferably being very slightly less than the diameter of the weld-washer so that there is a press fit such that the weld-washers can be installed in the recesses prior to shipment, and will not become dislodged prior to welding in place.

To prevent the relatively delicate slip plate 30 from being gouged and torn during the tractor/trailer coupling (and uncoupling) procedure, a hard plastic insert 41 is provided on each side arm of the skip plate. In the preferred embodiment, the plastic of the insert is nylon, which is substantially harder than the UHMW PE preferred for the slip plate, and therefore does not compress as much as the slip plate, and therefore absorbs the primary impact during the coupling operation.

The insert 41 is substantially straight and parallel to the inside of the arm of the U-shape. Preferably, the inserts are positioned slightly inwardly from the edges of the arms, and preferably, they are substantially flush with the surface of the slip plate.

Preferably, the inserts are thinner than the slip plate itself, and the slip plate is recessed at the insert locations by about the thickness of the inserts. For example, the thickness of the slip plate may be about 0.240 inches, and the thickness of the inserts may be 3/16 inches, with a 3/16 inch deep recess being provided in the surface of the slip plate.

Preferably, the inserts are press-fitted into the recess, so that they too may be pre-positioned and do not fall out during shipment of the product.

Note that the inserts also have recesses for weld-washers 36, so that they too are held in place by welds.

The outer lateral portions 40 of the slip plate are of a relatively hard, impact resistant composite material. Many reinforced plastics may be suitable, but one particularly suitable example is a molybdenum disulfide filled cotton/phenolic laminate, such as supplied by Cope Plastics of Huntsville, Ala. as Grade H-13020, having the following properties:

| | |
|---|---|
| Coefficient of friction: | 0.25–0.3 |
| Maximum operating temperature: | 250 degrees F. |
| Density: | 0.051 lb./in³ |
| Water absorption (⅛" thick): | 0.70% |
| Water absorption (⅛" thick): | 0.70% |
| Hardness (Rockwell): | 90 M |
| Tensile strength (with grain): | 8.0 × 10³ psi |
| Compressive strength (flatwise, ½ inch thick): | 42.0 × 10³ psi |
| Compressive strength (edgewise, ½ inch thick): | 22.0 × 10³ psi |
| Flexural strength (⅛ inch thick): | 20.0 × 10³ psi |
| Bonding strength (½ inch thick): | 23.0 × 10² lb |
| Impact strength (Izod, edgewise with grain): | 2.5 ft-lb.in |
| Impact strength (Izod, edgewise cross grain): | 2.0 ft-lb.in |

This material is normally used in areas where graphite is not allowed, and in such applications as bearings, pistons and packing rings.

Nylon reinforced with para-aramid may also be suitable, such as the Zytel-Kevlar SFC (trademarks) material supplied by DuPont.

Figure 5:
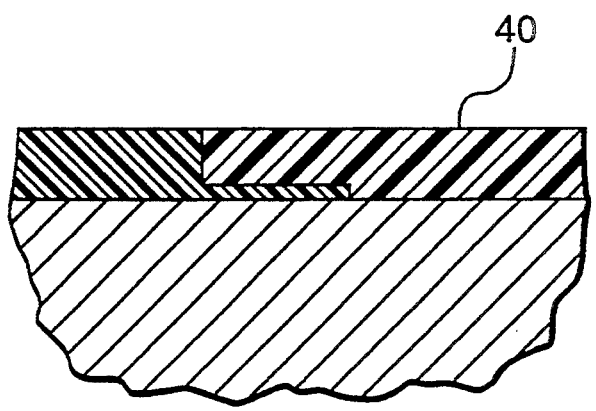
FIG. 5 is a cross-section at 5—5 of FIGS. 1 and 2.

Preferably, the outer portions 40 overlap the main portions 30a, 30b of the slip plate in a shiplap joint, as seen in FIG. 5. The joint is produced simply by using a router to prepare the mating edges.

The primary characteristics of the material are that it be harder and more impact-resistant than the plastic of the slip plate, while still having better lubrication than metal, and being easier to replace than metal. It generally will not compress or stretch to any significant degree.

It is a particular advantage of this invention that the outer portions 40, which tend to incur the most damage, can be removed and replaced with relative ease, without the labor and materials cost associated with replacing the entire slip plate. The outer portions can simply be broken or cut off, the weld washers in that area can then be removed by a torch or air chisel, the area can be ground smooth, and new outer portions can then be installed.

Figure 4:
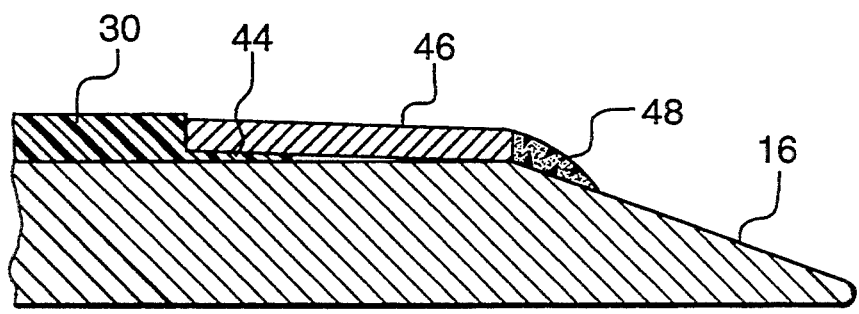
FIG. 4 is a cross-section at 4—4 of FIG. 1.

At the forward edge of each arm of the slip plate is a projecting lip 44. A steel bar 46 is welded to the upper plate as shown in FIG. 4, such that it anchors the lip 44. A fillet weld 48 is used at the front edge (as shown in FIG. 3) and around the side edges (not shown), and is ground at the front edge so that there is a relatively smooth transition to the flanges 16.

This configuration provides substantial improvements over earlier slip plates, by reducing the replacement cost, and optimizing the performance by placing the harder plastic inserts and composite materials where the most wear occurs, while maintaining the benefit of the softer plastic such as UHMW PE in terms of lubrication and cost (nylon or the like being considerably more expensive). When the UHMW PE wears down, there is no metal-on-metal contact. The nylon inserts, being fairly resistant to stretching, remain well secured in their positions, with little or no danger of being ripped out. The composite material outer portions offer good impact resistance, with better lubrication than metal, and are relatively easy to replace.

The invention has been described with particular reference to a preferred embodiment. Various modifications can be made, of course, without departing from the spirit of the invention, and such modifications are intended to be within the scope of the following claims.

I claim:

1. A fifth wheel slip plate assembly, comprising:

two plastic slip plate elements securable to overlie a top plate of a fifth wheel assembly with the slip plate elements together defining a generally U-shaped slip plate having a base and two arms, each arm having an inner edge, an end, and an outer edge;

at least one insert area defined in each slip plate element in each arm of said U-shaped slip plate;

a plastic insert in each said insert area, made of a plastic which is substantially harder than said slip plate elements; and an outer area on each arm, said outer area being of a reinforced composite plastic material.

2. A fifth wheel slip plate assembly, as recited in claim 1, where the material of said outer area is a molybdenum disulfide filled cotton/phenolic laminate.

3. A fifth wheel slip plate assembly, as recited in claim 1, where the material of said outer area is a nylon reinforced with para-aramid.

4. A fifth wheel slip plate assembly as recited in claim 1, where said plastic inserts are thinner than the slip plate itself, and the slip plate is recessed at the plastic insert locations by about the thickness of said plastic inserts.

5. A fifth wheel slip plate assembly as recited in claim 1, where the dimensions of said insert areas match the plastic insert dimensions such that the plastic inserts can be pressed into the insert areas and will not fall out during shipping or handling prior to installation.

6. A fifth wheel slip plate assembly as recited in claim 2, where the dimensions of said insert areas match the plastic insert dimensions such that the plastic inserts can be pressed into the insert areas and will not fall out during shipping or handling prior to installation.

7. A fifth wheel slip plate assembly as recited in claim 3, where the dimensions of said insert areas match the plastic insert dimensions such that the plastic inserts can be pressed into the insert areas and will not fall out during shipping or handling prior to installation.

8. A fifth wheel slip plate assembly as recited in claim 4, where the dimensions of said insert areas match the plastic insert dimensions such that the plastic inserts can be pressed into the insert areas and will not fall out during shipping or handling prior to installation.

9. A fifth wheel slip plate assembly as recited in claim 1, where said slip plate elements are of a material selected from the group consisting of ultra high molecular weight polyethylene and ultra high molecular weight polystyrene, and where the plastic of said plastic inserts is nylon.

10. A fifth wheel slip plate assembly, comprising:
a U-shaped plastic slip plate securable to overlie a top plate of a fifth wheel assembly, the slip plate having a base and two arms, each arm having an inner edge, an end, and an outer edge;
at least one insert area defined in each arm of said slip plate;
a plastic insert in each said insert area, made of a plastic which is substantially harder than said slip plate; and
an outer area on each arm, said outer area being of a reinforced composite plastic material.

11. A fifth wheel slip plate assembly, as recited in claim 10, where the material of said outer area is a molybdenum disulfide filled cotton/phenolic laminate.

12. A fifth wheel slip plate assembly, as recited in claim 10, where the material of said outer area is a nylon reinforced with para-aramid.

13. A fifth wheel slip plate assembly as recited in claim 10, where said plastic inserts are thinner than the slip plate itself, and the slip plate is recessed at the plastic insert locations by about the thickness of said plastic inserts.

14. A fifth wheel slip plate assembly as recited in claim 10, where the dimensions of said insert areas match the plastic insert dimensions such that the plastic inserts can be pressed into the insert areas and will not fall out during shipping or handling prior to installation.

15. A fifth wheel slip plate assembly as recited in claim 11, where the dimensions of said insert areas match the plastic insert dimensions such that the plastic inserts can be pressed into the insert areas and will not fall out during shipping or handling prior to installation.

16. A fifth wheel slip plate assembly as recited in claim 12, where the dimensions of said insert areas match the plastic insert dimensions, such that the plastic inserts can be pressed into the insert areas and will not fall out during shipping or handling prior to installation.

17. A fifth wheel slip plate assembly as recited in claim 13, where the dimensions of said insert areas match the plastic insert dimensions such that the plastic inserts can be pressed into the insert areas and will not fall out during shipping or handling prior to installation.

18. A fifth wheel slip plate assembly as recited in claim 14, where said slip plate elements are of a material selected from the group consisting of ultra high molecular weight polyethylene and ultra high molecular weight polystyrene, and where the plastic of said plastic inserts is nylon.

* * * * *